United States Patent [19]

Imai et al.

[11] Patent Number: 5,102,960

[45] Date of Patent: Apr. 7, 1992

[54] SILICON-EPOXY RESIN COMPOSITION

[75] Inventors: Seisaku Imai; Osamu Aoki, both of Bayer Japan Ltd., 10-8 Takanawa 4-chome, Minato-ku, Tokyo; Iwai: Tatsuki, 651-1, Osaka, Kashiba-machi, Kitakatsuragigun, Nara-ken; Nobuko Fukami, Bayer Japan Ltd., 10-8 Takanawa 4-chome, Minato-ku, Tokyo, all of Japan

[73] Assignee: Bayer Aktiengesellschaft, Leverkusen, Fed. Rep. of Germany

[21] Appl. No.: 405,629

[22] Filed: Sep. 11, 1989

[51] Int. Cl.$^5$ .................... C08G 77/04; C08L 63/04
[52] U.S. Cl. .................... 525/476; 525/487; 528/27
[58] Field of Search ................ 525/476, 487; 528/27

[56] References Cited

U.S. PATENT DOCUMENTS

| | | | |
|---|---|---|---|
| 3,317,443 | 5/1967 | Brady | 528/27 |
| 4,082,719 | 4/1978 | Liles et al. | 528/27 |
| 4,657,986 | 4/1987 | Isayama et al. | 525/407 |
| 4,859,722 | 8/1989 | Shiobara et al. | 525/476 |
| 4,877,822 | 10/1989 | Itoh et al. | 523/433 |
| 4,923,912 | 5/1990 | Sasaki et al. | 523/466 |

FOREIGN PATENT DOCUMENTS

| | | | |
|---|---|---|---|
| 60-069131 | 4/1985 | Japan | 528/27 |
| 60-124617 | 7/1985 | Japan | 528/27 |
| 1-020226 | 1/1989 | Japan | 528/27 |
| 1-048818 | 2/1989 | Japan | 528/27 |
| 1-153713 | 6/1989 | Japan | 528/27 |
| 1-217059 | 8/1989 | Japan | 525/476 |

*Primary Examiner*—John C. Bleutge
*Assistant Examiner*—R. Dean, Jr.
*Attorney, Agent, or Firm*—Connolly and Hutz

[57] ABSTRACT

A silicone-epoxy resin composition comprising
(A) 100 parts by weight of a curable epoxy resin,
(B) 1-100 parts by weight of an epoxy resin-modified silicone resin obtained by a condensation reaction of 1-99 mole % of an epoxy resin having at least one hydroxyl group and at least one epoxy group and 1-99 mole % of an organosiloxane or organosilane compound represented by the general formula

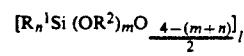

wherein $R^1$ represents a monvalent hydrocarbon group or a halogenated monovalent hydrocarbon group, $R^2$ represents a hydrogen atom or a monovalent aliphatic hydrocarbon group, is a number ranging from 1 to 1,500; n is a number ranging from 0.9 to 3; and m is a number ranging from 0.05 to 3.1 with a proviso that the sum of m+n is not greater than 4, and
(c) 1-100 parts by weight of an epoxy-modified polysiloxane having an epoxy equivalent ranging from 1,000 to 20,000, represented by the general formula

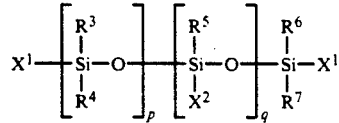

wherein $R^3$, $R^4$, $R^5$, $R^6$, and $R^7$ may be the same or different, each represents a lower alkyl group or a substituted or unsubstituted phenyl group; $X^1$ represents a monovalent aliphatic hydrocarbon group or an epoxy-containing organic group; $X^2$ represents an epoxy-containing organic group p is an integer of 1 to 500; and q is an integer of 0 to 100.

9 Claims, No Drawings

SILICON-EPOXY RESIN COMPOSITION

This invention relates to a silicone-epoxy resin composition, and especially to a silicone-epoxy resin composition excellent in physical properties such as mechanical properties, electrical properties, moisture resistance, water resistance, a low internal stress and a heat shock resistance, which is suitable as a molding material, a material for powder application, electrical parts and a sealing agent for electrical and electronic parts such as semiconductors, and especially suitable as a sealing agent for electrical and electronic parts.

As compared with other thermosetting resins, due to its excellent physical properties such as tenacity and adhesion as well as its economical efficiency, an epoxy resin composition in general has been offered for practical application in a wide range of use, for example, as a paint, an electrical material, a civil engineering material, an architectural material and an adhesive. Especially of late, it has been broadly used as a sealing material for semiconductors. In this field, however, in concomitance with the increase in degree of integration of the semiconductor, the mere combination of an epoxy resin for general purpose with a curing agent is insufficient from the viewpoint of the softness, tenacity, moisture resistance and adhesiveness of the cured resin, and an epoxy resin having higher mechanical properties has been desired.

Namely, the desired improvement includes an improvement in impact resistance by increasing the elongation at break and an improvement in adhesiveness and adhesive property to various substrates by reducing the internal stress such as a strain generated by a sudden change of temperature when an epoxy resin adheres to matters different in thermal linear expansion coefficient and an internal strain caused by contraction when the resin is cured.

In the face of a recent trend for ever thinner and more compact electrical and electronic parts and the increased size of semiconductor chips resulting from the increased degree of integration of semiconductors, the conventional epoxy resin for general purpose often causes crack of a package material, crack of silicon chips, a passivation crack and dislocation (slip) of aluminum wiring, and development of an epoxy resin having crack resistance withstanding a more strict heat cycle and a heat shock, moisture resistance, a low thermal linear expansion coefficient, a low modulus of elasticity and a high glass transition temperature has been strongly desired.

To this end, as a method of reducing the internal stress of an epoxy resin, the following methods have been proposed.

(1) Reduction of the thermal linear expansion coefficient of an epoxy resin to the proximity of that of an element. Specifically, addition to an epoxy resin of an inorganic filler like silica which is low in thermal linear expansion coefficient has been attempted. However, a high adding ratio of such a filler has caused a poor modability and a reduced fluidity, coupled with lowering of the crack resistance and rise of the modulus of elasticity of the resin.

(2) Addition of a so-called flexibility imparting agent to an epoxy resin has been attempted to reduce the modulus of elasticity. As such flexibility imparting agent, a rubber component and a flexible silicone compound have been used. Especially, the silicone compound is excellent in heat resistance as compared with the rubber component and many applications of such compound have been made including addition of silicone compounds reactive and non-reactive with an epoxy resin. Actually, however, the expected lowering of the internal stress has not been recognized. This is considered attributable to the basically poor compatibility of the silicone compound with an epoxy resin and to the unlikelihood of the formation of a so-called "islands-in-a-sea" sectional configuration showing a good dispersed state that is necessary for reducing the modulus of elasticity without reducing the glass transition temperature. On the other hand, a plurality of silicone-modified epoxy resins have been proposed in which an epoxy resin constitutional unit is chemically bound to a silicone compound for improving the compatibility. However, almost all of such silicone compounds are uniformly dissolved in the epoxy resin or form a dispersion having too small a particle size, none of such silicone-modified epoxy resins has ever exhibited lowering of the modulus of elasticity as had been expected, on the contrary, these silicone-modified epoxy resins have brought about undesirable problems such as lowering of the glass transition temperature. The resins of the present invention avoid such problems.

A silicone-epoxy resin composition of this invention comprises an epoxy resin-modified silicone resin obtained by a condensation reaction of a silicone resin intermediate having a silanol and/or alkoxy-silyl group and an epoxy resin having at least one epoxy group and at least one hydroxyl group in its molecule, an epoxy-modified polysiloxane having epoxy groups at its two terminals or at its two terminals and its side chain, and an epoxy resin containing at least two epoxy groups in its molecule. It is found that when the silicone-epoxy resin composition of this invention is combined with a phenol novolak resin and an amine type curing agent, it gives a cured composition exhibiting a low modulus of elasticity and a low thermal linear expansion coefficient and being not lowered in glass transition temperature without impairing the moisture resistance.

According to this invention, there is provided a silicone-epoxy resin composition which comprises (A) 100 parts by weight of a curable epoxy resin, (B) 1–100 parts by weight of an epoxy resin-modified silicone resin obtained by a condensation reaction of 1–99 mole % of an epoxy resin having at least one hydroxyl group and at least one epoxy group and 1–99 mole % of an organosiloxane or organosilane compound represented by the general formula

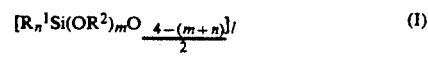

$$[R_n^1 Si(OR^2)_m O_{\frac{4-(m+n)}{2}}]_l \quad (I)$$

n $R^1$ represents a monovalent hydrocarbon group or a halogenated monovalent hydrocarbon group; $R^2$ represents a hydrogen atom or a monovalent aliphatic hydrocarbon group; l is a number ranging from 1 to 1,500; n is a number ranging from 0.9 to 3; and m is a number ranging from 0 05 to 3.1 with a proviso that the sum of m+n is not greater than 4, and (C) 1–100 parts by weight of an epoxy-modified polysiloxane having an epoxy equivalent ranging from 1,000 to 20,000 represented by the general formula:

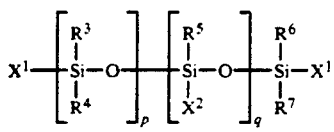

(II)

wherein $R^3$, $R^4$, $R^5$, $R^6$, and $R^7$ may be the same or different, each represents a lower alkyl group or a substituted or unsubstituted phenyl group; $X^1$ represents a monovalent aliphatic hydrocarbon group or an epoxy-containing organic group; $X^2$ represents an epoxy-containing organic group; p is an integer of 1 to 500; and q is an integer of 0 to 100.

The aforesaid silicone-epoxy resin composition of this invention can be made into a curable silicone-epoxy resin composition by blending therewith an inorganic filler such as crystalline and/or amorphous silica, a curing agent of the diamine type, acid anhydride type and phenol novolak resin type and a curing accelerator, which when cured gives a cured composition free from lowering of the glass transition temperature, being small in internal stress and therefore good in crack resistance which is especially suitable as a sealing agent for electrical and electronic parts.

A curable epoxy resin used as the first component (A) in the composition of this invention is an epoxy resin having at least two epoxy groups in one molecule, that can be cured by combination with a curing agent. As to its molecular structure and molecular weight, there is no particular restriction. Hence, an optional curable epoxy resin usually used in the field of the art is usable as such curable epoxy resin. Examples of such curable epoxy resin include glycidyl ethers of polyvalent phenols such as bisphenol A and bisphenol F; polygycidyl ethers of a phenol novolak resin such as phenol formaldehyde novolak; and an alicyclic epoxy resin derived from the epoxidation of an olefin bond.

Examples of an epoxy resin (B-1) having at least one hydroxyl group and at least one epoxy group used for producing the second component (B) of an epoxy resin-modified silicone resin include an epoxy resin produced by reacting a novolak type phenol resin obtained by the condensation reaction of phenols, for example, phenol, cresol, xylenol, resorcinol, catechol, bisphenol A and bisphenol F with formaldehyde in the presence of an acid catalyst, with epichlorohydrin or reacting polyvalent phenols such as bisphenol A, bisphenol F, polyparavinyl phenol resin, resorcinol, catechol and hydroquinone with epichlorohydrin in the presence of an alkali.

On the other hand, in an organosiloxane or organosilane compound (B-2) of said formula (I) to be reacted with this epoxy resin, as a monovalent hydrocarbon group, $R^1$, there may be cited a lower alkyl group such as, for example, methyl, ethyl, propyl, isopropyl, butyl, isobutyl, sec-butyl, tert-butyl, pentyl and hexyl; and aryl group such as phenyl, tolyl and naphthyl; an alkenyl group such as allyl; and aralkyl group such as benzyl and phenetyl; and a cycloalkyl group such as cyclopentyl and cyclohexyl, and examples of a halogenated monovalent hydrocarbon group include tetrafluoroethyl, perfluorovinyl, dichlorophenyl and α, α, α-trifluorotolyl group.

Examples of a monovalent aliphatic hydrocarbon group represented by $R^2$ include a lower alkyl group such as methyl, ethyl, propyl, isopropyl, butyl, isobutyl, sec-butyl, tert-butyl and pentyl; a lower alkenyl group such as vinyl and allyl; and aralkyl group such as benzyl and phenetyl; and a cycloalkyl group such as cyclopentyl and cyclohexyl.

In this specification, the term "lower" means that number of carbon atoms of an atomic group or a compound subsequent to this term is not more than 6, preferably not more than 4.

The compound of the formula (I) may exist in the state of a monomer (l=1), namely, silanes or polysiloxanes (l=2) produced by (co)polymerization of one or more kinds of such monomer, or in the state of a mixture of these silanes or polysiloxanes. The character l representing the degree of polymerization may be not more than 1,500, preferably not more than 200, further preferably not more than 100, and especially not more than 50.

The condensation reaction of the aforesaid epoxy resin (B-1) and the organosiloxane or organosilane compound (B-2) may be carried out according to a method known per se, for example, the method described in U.S. Pat. No. 3,170,962, incorporated herein by reference. The reaction ratio of the aforesaid epoxy resin (B-1) to the organosiloxane or organosilane compound (B-2) may be, in the (B-1)/(B-2) molar ratio, 99/1 to 1/99, preferably 10/1 to 1/50, and more preferably 5/1 to 1/20.

An epoxy resin-modified silicone resin obtained by said condensation reaction may have a number average molecular weight within the range of generally 250 to 100,000, preferably 1,000 to 20,000 and an epoxy equivalent within the range of 200 to 100,000, preferably 400 to 10,000.

Further, an epoxy-modified polysiloxane which is a third component (C) is represented by the aforesaid general formula (II) in which an epoxy group having an epoxy equivalent of 1,000 to 20,000, preferably 2,000 to 10,000 is introduced to polysiloxane. In the formula (II), "a lower alkyl group" represented by $R^3$ to $R^7$ includes methyl, ethyl, propyl, isopropyl, butyl, isobutyl, sec-butyl and tert-butyl and as a substituent which may be present in the phenyl group in "a substituted or unsubstituted phenyl group", there may be cited the lower alkyl group as mentioned above, an alkoxy group such as methoxy and ethoxy; and a nitro group.

As "an epoxy-containing organic group" represented by $X^1$ and/or $X^2$, compounds having the following structural formulae may be cited,

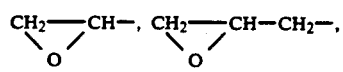

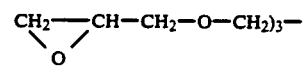

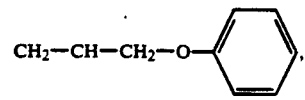

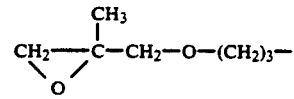

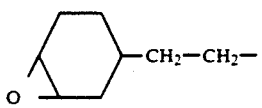

As "a monovalent aliphatic hydrocarbon group" represented by $X^1$, there may be cited what is mentioned with respect to $R^2$ in the formula (I).

The epoxy-modified polysiloxane in the formula (II) has at least one siloxane unit represented by the following formula

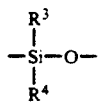 (1)

and usually what has 20-200 such units (p=1-500) is suitable.

An epoxy-containing siloxane unit represented by the following formula

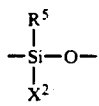 (2)

may not necessarily be present (q=0). Generally, however, the presence of 0-5 such units (q=0-10) is convenient.

Each of the aforesaid units (1) and (2) may be present as a block or a random copolymer.

The epoxy-modified polysiloxane of the formula (II) may have a number average molecular weight within the range of 2,000 to 200,000 preferably 4,000 to 30,000 and an epoxy equivalent within the range of 1,000 to 200,000, preferably 2,000 to 10,000.

The composition of this invention may prepared by mixing the aforesaid indispensable components (A), (B) and (C) with one another. The mixing ratio at that time may be varied within a broad range according to the use and the physical properties required of said composition. Generally, however, it is appropriate to mix them within the ranges mentioned hereunder.

| Component | Mixing ratio (in part by weight) | |
|---|---|---|
| | General Range | Suitable Range |
| (A) | 100 | 100 |
| (B) | 1-100 | 5-50 |
| (C) | 1-100 | 5-50 |

Further, from the point of view of the dispersibility of each component mixed, it is desirable that the weight ratio of (A)/(B)+(C) is generally within the range of 0.5 to 50, preferably 1.0 to 20, and the weight ratio of (C)/(B) is generally within the range of 0.01 to 10, preferably 0.1 to 2.

The composition of this invention may comprise, in addition to the aforesaid three indispensable components, other additives blended therewith.

Such additives include an inorganic filler, a curing agent, a curing accelerator, a flame retardant, a coloring agent, a silane coupling agent and a mold releasing agent. As a blendable inorganic filler, there may be cited, for example, silica (crystalline or amorphous), alumina, calcium carbonate, titanium oxide, calcium silicate, asbestos, graphite, quartz powder, talc, mica and boron nitride. These additives may be blended at a ratio of 10 to 1,000 parts by weight, preferably 50 to 700 parts by weight based on 100 parts by weight of the total of the components (A), (B) and (C).

A curing agent or curing accelerator which can be used in this invention includes what is usually used as a curing agent for an epoxy resin including an organic amine type curing agent, for example, a chain aliphatic polyamine such as dimethylene triamine, an alicyclic polyamine such as isophorone diamine, an aromatic amine such as methaphenylene diamine; an acid anhydride type curing agent, for example, pyromellitic anhydride, methylhexene tetracarboxylic anhydride, tetrahydrophthalic anhydride and polyadipic anhydride; a polyamide resin curing agent produced by condensation of dimer acid and polyamine (for example, BARTHAMIDE 125 (a product of Henkel-Hakusui) and POLYMIDE L-16-3, (a product of Sanyo-Kasei)); an imidazole type curing agent such as 2-ethyl-4-methylimidazole, 2-phenylimidazole, 1-benzyl-2-methyl imidazole and 1-dodecyl-2-methyl-3-benzyl imidazolium chloride; a boron trifluoride-amine complex, dicyandiamide and derivatives thereof; a visible ray curing agent (hardener) which is a combination of a dially iodonium salt and a dye (for example, Acridin Orange, benzoflavin, Setoflavin T); an ultraviolet ray curing agent (hardener) such as an aromatic diazonium salt, a triallyl selenium salt, a diallyl iodonium salt and a triallyl sulfonium salt; a curing agent of the polyhydric alcohol esters of thiogluconic acid type and of the polymercaptan of polysulfide resin type; and oligomer curing agents such as novolak type phenolic resin, polyvinyl phenol and its bromide.

From the aforesaid three components of (A), (B) and (C), the composition of this invention may be prepared by mixing and uniformly dispersing them at room temperature or as required with heating to a temperature not more than 160.C by a mixer such as a homomixer preferably in vacuo or under reduced pressure. Or the composition of this invention may be prepared by dissolving the component (B) in a solvent such as alkoxy acetate in advance, adding and mixing the components (A) and (C) and other components to and with the resulting solution and then removing the solvent.

The composition provided by this invention may be cured by heating or irradiation of ultraviolet rays thereto, thereby giving a cured composition which is excellent in crack resistance, mechanical strength, moisture resistance, etc., having a low thermal linear expansion coefficient and a low modulus of elasticity at very little lowering of a glass transition temperature.

Accordingly, the composition of this invention may be used broadly as a material for various machines and tools, especially as electronic parts for a transistor, an IC (integrated circuit), a diode and a thermistor, as a sealing agent for electrical parts such as a coil for a transformer and a thermistor in such fields as a casting agent, a coating material, and adhesive and a powdered paint.

Hereinbelow, the present invention will be illustrated in further detail by way of examples without limiting it thereto. In the following examples, "parts" means "parts by weight".

A mixture of 1,800 parts of an epoxy resin (trade name "EPICOAT-1001", a product of Yuka-Shell, a bisphenol A type epoxy resin having an epoxy equivalent of 450-500, a hydroxyl group value of 130 and a softening point of 68° C.), 700 parts of 1,2,3,4,5-pentamethyl 1,3,4-triphenyl 1,2,5-tributoxypentasiloxane, 0.5 part of tetrabutoxy titanate and 1,500 parts of 1-methoxy propyl acetate resin (1).

A mixture of 15 parts of a 60% by weight 1-methoxy propyl acetate solution of the epoxy resin-modified silicone resin (1), 73 parts of an orthocresol novolak epoxy resin (trade name "EPICOAT 180H65", a product of Yuka-Shell) and 18 parts of two-terminal n-propylglycidylether-modified polysiloxane (trade name "X-22-163F", a product of Shin Etsu Chemical Industries, having an epoxy equivalent of 5,500) was heated to be melted at 120-140° C. for 30 minutes and vigorously stirred in a vacuum homomixer (a product of Tokushu Kika KK). Thereafter, when the solvent was removed under a reduced pressure (1-5 mm Hg), an opaque molten dispersion was obtained. When it was cooled to room temperature, a white lustrous curable silicone-epoxy resin composition (having a softening point of 65.C) was obtained.

EXAMPLE 2

A mixture of 940 parts of pentaethoxy octyl siloxane (containing 25 mole % of a dimethyl siloxane unit, 35 mole % of a phenyl methyl siloxane unit and 36 mole % of a methyl siloxane units), 1,000 parts of an epoxy resin (trade name "EPICOAT-1001", I0 a product of Yuka-Shell, a bisphenol A type epoxy resin having an epoxy equivalent of 450-500, a hydroxyl group value of 130 and a softening point of 68° C.), 1 part of tetrabutoxy titanate, 160 parts of isobutanol and 1,130 parts of 1-methoxy propyl acetate was heated at 150° C. for 8 hours. Then, the heated mixture became a uniform liquid, giving about 3,230 parts of an epoxy resin-modified silicone resin (2).

A mixture of 100 parts of a solution of the epoxy resin-modified silicone resin (1), 50 parts of a solution of the epoxy resin-modified silicone resin (2), 730 parts of an ortho-cresol novolak epoxy resin (trade name "EPICOAT-180H65", a product of Yuka-Shell, having an epoxy equivalent of 199 and a softening point of 65° C.) and 180 parts of a two-terminal n-propyl glycidyl ether-modified polydimethyl siloxane (trade name "X-22-163E", a product of Shin-Etsu Chemical Industries, having an epoxy equivalent of 3,700) was heated. The obtained molten mixture was vigorously stirred at 100-140° C. for about 30 minutes in a vacuum homomixer. Thereafter, the resulting mixture was stirred under a reduced pressure of 1-5 mm Hg, the solvent was removed and the remaining mixture was cooled to give about 1,000 parts of a white, lustrous, solid silicone-epoxy resin composition. The resulting solid composition has a softening point of 65° C.

EXAMPLE 3

A vacuum homomixer was charged with 100 parts of a solution of the epoxy resin-modified silicone resin (1), 50 parts of a solution of the epoxy resin-modified silicone resin (2), 150 parts of a two-terminal n-propylglycidylether-modified polydimethyl siloxane (trade name "X-22-163F", a product of Shin-Etsu Chemical Industries, having an epoxy equivalent of 5,500) and 780 parts of a bisphenol A type epoxy resin (trade name "LEKSAM X-18", a product of Bayer AG of West Germany). The content was heated at 120-130° C., vigorously stirred and dispersed for about 30 minutes, then the solvent was removed therefrom under reduced pressure. When the remaining content was cooled, about 1,000 parts of a white, lustrous, highly viscous liquid silicone-epoxy resin composition was obtained.

The optical microscopic observation of the obtained composition confirmed dispersion of the two-terminal-modified polysiloxane as very fine particles having a particle size of less than about 0.1 m$\mu$.

EXAMPLE 4

A vacuum homomixer was charged with 100 parts of the epoxy resin-modified silicone resin (1), 50 parts of the epoxy resin-modified silicone resin (2), 250 parts of a two-terminal n-propylglycidylether-modified polydimethyl siloxane (trade name "X-22-I63E", a product of Shin Etsu Chemical Industries, having an epoxy equivalent of 3,700) and 630 parts of a bisphenol F type epoxy resin (trade name "EPICOAT-807", a product of Yuka-Shell, having an epoxy equivalent of 172), the content was vigorously stirred under heating at 110-130° C. After about 30 minutes, while the stirring was being continued, the solvent was removed under reduced pressure, and about 1,000 parts of a white, lustrous, viscous liquid silicone-epoxy resin composition was obtained. The microscopic observation of the resulting composition revealed the particle size of the dispersed epoxy-modified polydimethyl siloxane of less than 0.1 m$\mu$.

EXAMPLE 5

At first, 2 kinds of epoxy resin-modified silicone resin solutions (3) and (4) were synthesized by the following methods.

The epoxy resin-modified silicone resin solution (3) was obtained as a uniform solution in an amount of about 2,575 parts by heating a mixture of 1,000 parts of a bisphenol A type epoxy resin (trade name "EPICOAT 1001", a product of Yuka-Shell), 544 parts of diphenyl diethoxy silane, 1.0 parts of tetrabutoxy titanate and 1,030 parts of 1-methoxy propyl acetate at 150° C. for 8 hours.

On the other hand, about 2,988 parts of the epoxy resin-modified silicone resin (4) was obtained as a uniform solution by heating a mixture of 1,000 parts of the epoxy resin ("EPICOAT 1001"), 792 parts of diphenyl diethoxy silane, 1.0 part of tetrabutoxy titanate and 1,195 parts of 1-methoxy propyl acetate at 150° C. for 8 hours.

A vacuum homomixer was charged with 10 parts and 5 parts, respectively of the obtained epoxy resin-modified silicone resin solutions (3) and (4), 73 parts of an ortho-cresol novolak epoxy resin (trade name "EPICOAT 180H65", a product of Yuka-Shell) and 18 parts of a two-terminal n-propyl glycidylether-modified polysiloxane (trade name "X-22-163F", a product of Shin-Etsu Chemical Industries, having an epoxy equivalent of 5,500), the content was heated to be melted at 120°-140° C., vigorously stirred and mixed. Thereafter, when the solvent was removed under a reduced pressure (1-5 mm Hg), an opaque molten substance was obtained, which when cooled to room temperature gave 100 parts of a white, lustrous, solid cured silicone-poxy resin composition.

EXAMPLE 6

A mixture of 7,182 parts of a bisphenol A type epoxy resin (trade name "EPICOAT 1001", a product of Yuka-Shell), 2,738 parts of a silicone resin (trade name "SKT2898", a product of Bayer AG) consisting of 82.5 mole % of a diphenyl disiloxane unit and 17.5 mole % of a dimethyl siloxane unit, containing about 20% (by weight) of an ethoxy group directly bound to a silicon atom, 5,000 parts of 1-methoxy propyl acetate, 1,000 parts of isobutanol and 97 parts of a 10% (by weight) xylene solution of tetrabutoxy titante was heated at 155° C. for 3 hours to give 16,000 parts of a 60% (by weight) solution of an epoxy resin-modified silicone resin (5).

On the other hand, a mixture of 5,368 parts of a bisphenol A type epoxy resin ("EPICOAT 1001"), 4,634 parts of the aforesaid silicone resin (trade name "SKT2898", a product of Bayer AG), 5,000 parts of 1-methoxy propyl acetate, 1,000 parts of isobutanol and 97 parts of a 10% (by weight) xylene solution of tetrabutoxy titante was heated at 155° C. for 3 hours to give 16,000 parts of a 60% (by weight) solution of an epoxy resin-modified silicone resin (6).

A vacuum homomixer was charged with 10 parts of the aforesaid silicone resin solution (5), 5 parts of the aforesaid silicone resin solution (6), 73 parts of an ortho-cresol novolak epoxy resin (trade name "EPICOAT 180H65", a product of Yuka-Shell) and 18 parts of n-propylglycidylether-modified polysiloxane (trade name "X-22-9000", a product of Shin-Etsu Chemical Industries, having an epoxy equivalent of 3,970), the mixture was heated and melted at 110–120° C. and vigorously stirred for 30 minutes and mixed. Thereafter, when the solvent was removed under a reduced pressure (3–4 mm Hg), an opaque molten dispersed liquid was obtained, and when it was cooled to room temperature, 100 parts of a white, lustrous, solid silicone-epoxy resin composition was obtained.

The silicone-epoxy resin compositions obtained in Examples 1 to 6 were compounded with additives such as curing agents, inorganic fillers, etc. of the kinds and amounts (in part by weight) shown in the following Table 1, they were melt-mixed with hot twin rolls and then cured. The physical properties of the resulting cured compositions blended with these additives (Examples a-e) were compared with those of the cured composition not containing the silicone-epoxy resin compositions.

The results are shown in Table 2.

TABLE 1

|  | Example | | | | | Comparative Example | | | | |
|---|---|---|---|---|---|---|---|---|---|---|
|  | a | b | c | d | e | 1 | 2 | 3 | 4 | 5 |
| O-cresol novolak epoxy resin |  |  |  |  |  | 19.0 | 18.0 |  |  | 20.0 |
| Bisphenol A type epoxy resin |  |  |  |  |  |  |  | 19.5 |  |  |
| Bidphenol F type epoxy resin |  |  |  |  |  |  |  |  | 20.0 |  |
| Silicone-epoxy resin composition (Example 1) | 20.0 |  |  |  |  |  |  |  |  |  |
| Silicone-epoxy resin composition (Example 5) |  | 20.0 |  |  |  |  |  |  |  |  |
| Silicone-epoxy resin composition (Example 3) |  |  | 20.4 |  |  |  |  |  |  |  |
| Silicone-epoxy resin composition (Example 4) |  |  |  | 23.4 |  |  |  |  |  |  |
| Silicone-epoxy resin composition (Example 6) |  |  |  |  | 20.0 |  |  |  |  |  |
| Phenol novolak resin | 7.4 | 7.4 |  |  | 7.4 | 8.4 | 9.4 |  |  | 7.4 |
| Aromatic diamine curing agent (*1) |  |  | 9.5 |  |  |  |  | 11.6 |  |  |
| 2E4ME (*2) |  |  |  | 6.5 |  |  |  |  | 5.5 |  |
| Brominated epoxy resin | 2.0 | 2.0 |  |  | 2.0 | 2.0 | 2.0 |  |  | 2.0 |
| Triphenyl phosphine | 0.5 | 0.5 |  |  | 0.5 | 0.5 | 0.5 |  |  | 0.5 |
| Carnauba wax | 0.5 | 0.5 | 0.5 | 0.5 | 0.5 | 0.5 | 0.5 | 0.5 | 0.5 | 0.5 |
| Carbon black | 0.3 | 0.3 | 0.3 | 0.3 | 0.3 | 0.3 | 0.3 | 0.3 | 0.3 | 0.3 |
| Antimony trioxide | 0.3 | 0.3 | 0.3 | 0.3 | 0.3 | 0.3 | 0.3 | 0.3 | 0.3 | 0.3 |
| Gamma-glycidoxypropyl trimethoxysilane | 0.3 | 0.3 | 0.3 | 0.3 | 0.3 | 0.3 | 0.3 | 0.3 | 0.3 | 0.3 |
| Fused silica | 68.7 | 68.7 | 68.7 | 68.7 | 68.7 | 68.7 | 68.7 | 68.7 | 68.7 | 68.7 |

(*1) ACMEX H84 (a product of Nihon Gosei Kako)
(*2) 2-ethyl-4-methylimidazole

TABLE 2

| Physical properties* Item | Example | | | | | Comparative Example | | | | |
|---|---|---|---|---|---|---|---|---|---|---|
|  | a | b | c | d | e | 1 | 2 | 3 | 4 | 5 |
| Flexural strength (kg/mm$^2$) | 12.0 | 12.5 | 11.5 | 11.0 | 12.0 | 12.5 | 12.8 | 12.0 | 11.0 | 12.0 |
| Flexural modulus of elasticity (kg/mm$^2$) | 1060 | 1100 | 1000 | 1020 | 1170 | 1300 | 1350 | 1280 | 1250 | 1350 |
| Thermal linear expansion coefficient ($10^5$/°C.) | 1.8 | 1.8 | 1.8 | 1.8 | 1.8 | 1.8 | 1.8 | 1.8 | 1.8 | 1.8 |
| Crack resistance (%) | 0 | 0 | 0 | 0 | 0 | 90 | 98 | 88 | 96 | 100 |
| Water absorption coefficient (%) | 0.8 | 0.6 | 1.2 | 1.2 | 0.6 | 0.8 | 0.8 | 1.4 | 1.4 | 1.2 |
| Internal stress (kg/mm$^2$) | 15.4 | 14.2 | 13.5 | 14.1 | 15.0 | 33.0 | 32.0 | 29.5 | 29.6 | 31.5 |

Methods of evaluating the physical properties of the cured composition (1) Crack resistance A 9 0×4.5×0.5 mm silicone chip was sealed with the composition of each Example or Comparative Example under molding conditions, at 150° C. for 2 minutes and then post-cured at 180° C. for 4 hours. The obtained molding material was immersed in a dry ice/acetone bath at a temperature ranging from −8° C. to 8° C. for 30 minutes, and thereafter heated at 150° C. for 30 minutes. This cooling/heating cycle was repeated 50 times with respect to 50 samples per each Example or Comparative Example, from the results of which the ratio of crack occurrence was sought.

(2) Water absorption ratio

A 60 mm$\phi$×8 mm disk sample of the composition of each Example or Comparative Example that was cured at 160° C. for 2 minutes, and thereafter post-cured at 180° C. for 4 hours, was allowed to stand inside a pressure cooker at 120° C. under 2 atms. for 24 hours. The amount of water absorbed by the sample during the period was measured, from which the water absorption coefficient was sought.

(3) Internal stress

A piezoresistance element was die bound to a 16-pin DIP type IC frame and its initial resistance ($R_0$) was measured. Thereafter, this element was sealed with the composition of each Example of Comparative Example at 160° C. for 5 minutes, and its resistance (R) was measured. From these values of ($R_0$) and (R), ($R-R_0$)/$R_0$ was sought and made the internal stress.

(4) Mechanical strengths (flexural strength and flexural modulus of elasticity)

The composition of each Example or Comparative Example was cured at 150° C. for 2 minutes, and thereafter post-cured at 180° C. for 4 hours to mold a deflective rod. The flexural strength and flexural modulus of elasticity of this rod were measured according to JIS K6911.

(5) Thermal linear expansion coefficient

It is a value measured by a delatometer at a temperature elevating speed of 5° C./min of a 4 mmφ×15 mm test piece obtained by curing and molding the composition of each Example or Comparative Example.

What is claimed is:

1. A silicone-epoxy resin composition comprising
(A) 100 parts by weight of a curable epoxy resin,
1-100 parts by weight of an epoxy resin-modified silicone resin obtained by a condensation reaction of 1-99 mole % of an epoxy resin (B-1) having at least one hydroxyl group and at least one epoxy group and 1-99 mole % of an organosiloxane or organosilane compound (B-1) represented by the general formula

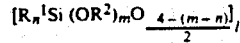

wherein $R^1$ represents a monovalent hydrocarbon group or a halogenated monovalent hydrocarbon group, $R^2$ represents a hydrogen atom or a monovalent aliphatic hydrocarbon group, l is a number ranging from 1 to 1,500; n is a number ranging from 0.9 to 3; and m is a number ranging from 0.05 to 3.1 with a proviso that the sum of m+n is not greater than 4, and (C) 1-100 parts by weight of an epoxy-modified polysiloxane having an epoxy equivalent ranging from 1,000 to 20,000, represented by the general formula

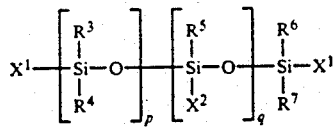

wherein $R^3$, $R^4$, $R^5$, $R^6$ and $R^7$ may be the same or different, each represents a lower alkyl group or a substituted or unsubstituted phenyl group; $X^1$ represents a monovalent aliphatic hydrocarbon group or an epoxy-containing organic group; $X^2$ represents an epoxy-containing organic group p is an integer of 1 to 500; and q is an integer of 0 to 100.

2. A silicone-epoxy resin composition according to claim wherein the molar ratio of said epoxy resin (A)(B-1) to the organosiloxane or organosilane compound used to produce (B) is 10/1 to 1/50.

3. A silicone-epoxy resin composition according to claim wherein the molar ratio of said epoxy resin (A)(B-1) to the organosiloxane or organosilane compound used to produce (B) is 5/1 to 1/20.

4. A silicone-epoxy resin composition according to claim 1 wherein the weight ratio of (A)/(B)+(C) is within the range of 0.5 to 50, and the weight ratio of (C)/(B) is within the range of 0.01 to 10.

5. A silicone-epoxy resin composition according to claim 4 wherein the weight ratio of (A)/(B)+(C) is within the range of 1.0 to 2 and the weight ratio of (C)/(B) is within the range of 0.1 to 2.

6. A silicone-epoxy resin composition according to claim 1 wherein the curable epoxy resin (A) is a glycidyl ether having at least two epoxy groups in the molecule.

7. A silicone-epoxy resin composition according to claim 6 wherein the curable epoxy resin (A) is a glycidyl either of bisphenol A or bisphenol F.

8. A silicone-epoxy resin composition according to claim 1 wherein the curable epoxy resin (A) is a polyglycidyl ether having at least two epoxy groups in the molecule.

9. A silicone-epoxy resin composition according to claim 8 wherein the curable epoxy resin (A) is a phenol novolak resin.

* * * * *